United States Patent [19]

Boyd, Jr.

[11] Patent Number: 5,758,709

[45] Date of Patent: Jun. 2, 1998

[54] METHOD OF FABRICATING A ROTOR FOR AN ELECTRIC MOTOR

[75] Inventor: John H. Boyd, Jr., Holland, Mich.

[73] Assignee: General Electric Company, Fort Wayne, Ind.

[21] Appl. No.: 567,094

[22] Filed: Dec. 4, 1995

[51] Int. Cl.$^6$ .............................. B22D 17/00; B22D 19/00
[52] U.S. Cl. ................................................ 164/109; 164/111
[58] Field of Search .............................. 164/98, 108, 109, 164/110, 111, DIG. 10

[56] References Cited

U.S. PATENT DOCUMENTS

| | | |
|---|---|---|
| 917,138 | 4/1909 | Robinson . |
| 1,042,408 | 10/1912 | Dearborn . |
| 1,650,795 | 11/1927 | Johnson ............................... 164/109 X |
| 2,015,554 | 9/1935 | Fisher . |
| 2,201,699 | 5/1940 | Myers . |
| 2,265,333 | 12/1941 | Wry ............................... 164/109 X |
| 2,386,673 | 10/1945 | Fisher . |
| 2,519,895 | 8/1950 | Edwards et al. . |
| 2,525,455 | 10/1950 | Merrill . |
| 2,525,456 | 10/1950 | Merrill . |
| 2,543,639 | 2/1951 | Merrill . |
| 2,643,350 | 6/1953 | Merrill . |
| 2,710,931 | 6/1955 | Tittel et al. . |
| 2,927,229 | 3/1960 | Merrill . |
| 3,126,493 | 3/1964 | Honsinger . |
| 3,457,445 | 7/1969 | Dochterman . |
| 3,818,294 | 6/1974 | Glukhov et al. . |
| 3,891,879 | 6/1975 | Yamada et al. . |
| 3,909,647 | 9/1975 | Peterson . |
| 3,967,827 | 7/1976 | Lehmann . |
| 3,968,390 | 7/1976 | Yasuda et al. . |
| 4,139,790 | 2/1979 | Steen . |
| 4,339,679 | 7/1982 | Urschel . |
| 4,454,438 | 6/1984 | Yamashita et al. . |
| 4,473,752 | 9/1984 | Cronin . |
| 4,476,408 | 10/1984 | Honsinger . |
| 4,476,422 | 10/1984 | Kirschbaum . |
| 4,726,112 | 2/1988 | King et al. . |
| 4,806,717 | 2/1989 | Hershberger . |
| 4,843,271 | 6/1989 | Shah . |
| 4,856,182 | 8/1989 | Fisher et al. . |
| 4,922,152 | 5/1990 | Gleghorn et al. . |
| 4,954,736 | 9/1990 | Kawamoto et al. . |
| 5,097,166 | 3/1992 | Mikulic . |
| 5,117,553 | 6/1992 | Kliman . |
| 5,159,220 | 10/1992 | Kliman . |
| 5,161,597 | 11/1992 | Dohogne ................................ 164/109 |

FOREIGN PATENT DOCUMENTS

| | | |
|---|---|---|
| 59-153562 | 9/1984 | Japan ....................... 164/109 |
| 1177247 | 1/1970 | United Kingdom . |

*Primary Examiner*—J. Reed Ratten, Jr.
*Attorney, Agent, or Firm*—Enrique J. Mora

[57] ABSTRACT

An electric motor includes a stator having a stator core, a start winding and first and second main windings. The first main winding and the start winding are configured to form a lower number of poles than the second main winding. The stator core forms a stator bore. The motor also includes a rotor having a rotor shaft concentrically arranged axially of the stator core and a rotor core positioned concentrically with the rotor shaft. Secondary conductors are arranged axially of the rotor shaft and extend through the rotor core. A plurality of permanent magnets are located at an outer periphery of the rotor core and are magnetized to form a number of poles equal to the number of poles formed by the second main winding.

9 Claims, 1 Drawing Sheet

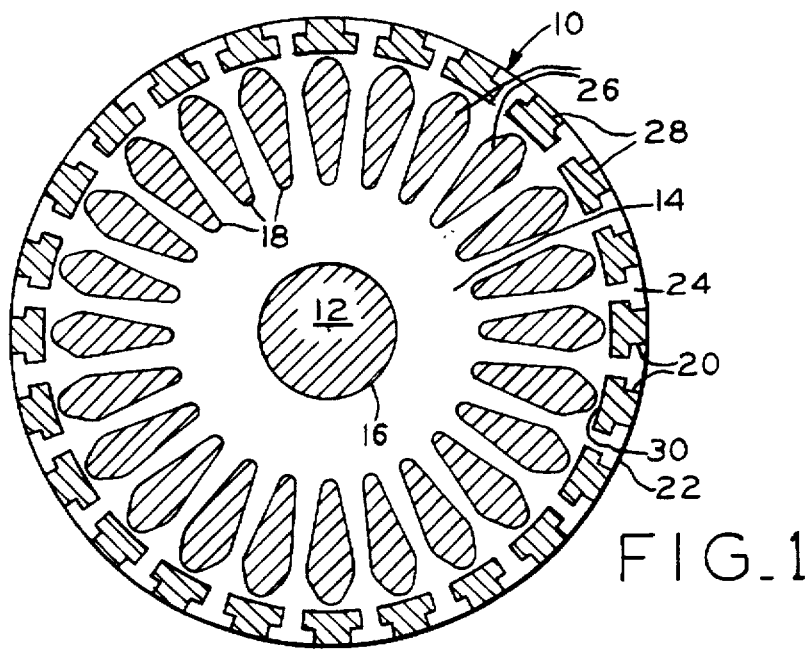
FIG_1
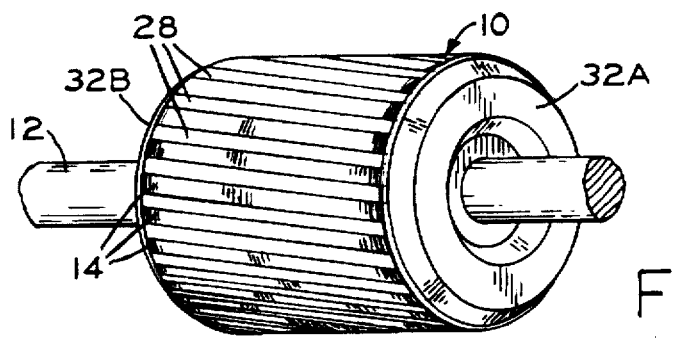
FIG_2
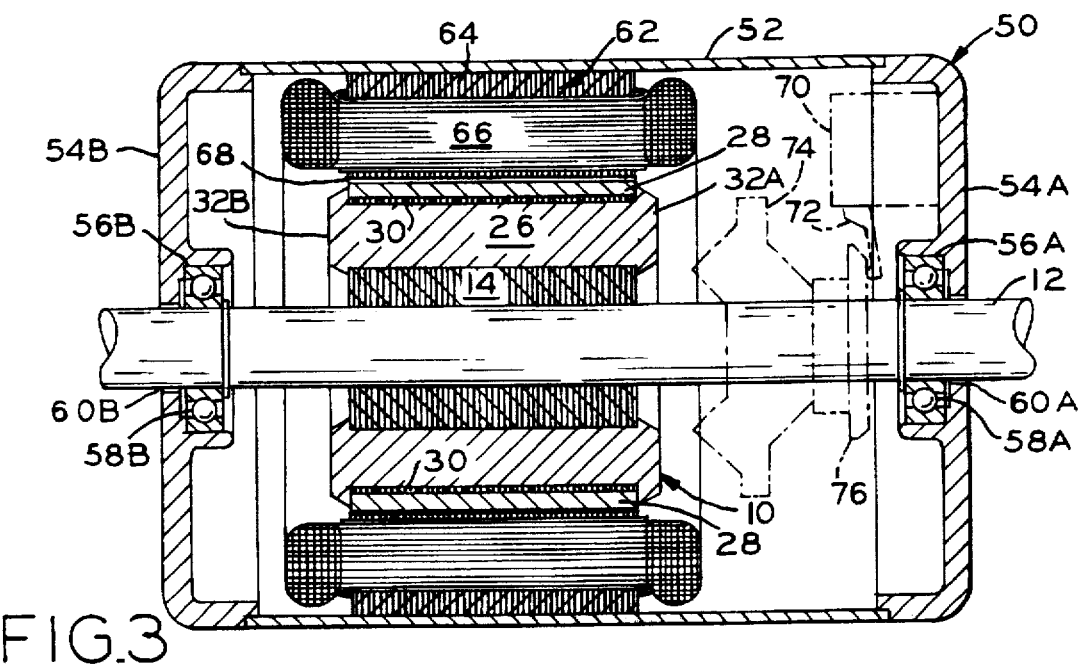
FIG_3

5,758,709

METHOD OF FABRICATING A ROTOR FOR AN ELECTRIC MOTOR

FIELD OF THE INVENTION

This invention relates generally to electric motors and, more particularly, to a line start magnetically salient rotor AC electric motor which, in at least one embodiment, is operable as a two speed motor.

BACKGROUND OF THE INVENTION

Two speed induction motors are well known. Such motors typically are utilized for applications such as furnace blower motors where, under certain predetermined conditions, a high or low motor speed is required. For example, in some furnace systems, the furnace includes a blower fan which selectively operates in low and high fire modes. The blower fan rotates at a slower speed in the low fire mode and rotates at a higher speed in the high fire mode. A motor which drives the blower fan therefore operates at a low speed for the low fire mode and at a high speed for the high fire mode.

Two speed induction motors which may be used in applications such as furnace blower motors typically include stators having two main windings and one start winding. A first main winding forms a first, lower, number of poles and a second main winding forms a second, higher, number of poles. The start winding forms the first number of poles.

The rotor may be a "squirrel cage" type rotor. Particularly, such a rotor includes a rotor core formed by a plurality of laminations. The rotor shaft axis of course is coaxial with the rotor core axis of rotation. Short circuited secondary conductors extend through the rotor core and are arranged axially with respect to the rotor shaft at the outer periphery of the rotor.

In initial operation, the start winding and the first main winding are energized. The magnetic fields generated by such windings induce currents in the moving secondary conductors of the rotor. As is well known, the magnetic fields generated by such windings and the current carrying secondary conductors couple and create a torque which causes rotation of the rotor.

Once sufficient rotor speed is attained, e.g. the rotor speed exceeds the synchronous speed of the second main winding, the start winding and the first main winding are de-energized and the second main winding is energized, i.e., for low fire mode. Typically, the motor will continue operating with only the second main winding energized, i.e., the low fire mode. Under certain conditions, however, the first main winding is energized and the second main winding is de-energized. For example, if the furnace is required to operate in the high fire mode on a particularly cold day, the furnace blower motor will operate with the first main winding energized and the second main winding is de-energized. With the first main winding energized, the motor speed is increased as compared to the motor speed when the second main winding is energized. When warmer weather returns, the furnace operates in the low fire mode with only the motor second main winding energized.

Although known conventional induction motors are relatively quiet as compared to other types of known motors, the rotor in an induction motor rotates at a speed less than synchronous speed. For example, in the case of a six pole induction motor, the synchronous speed (for sixty hertz operation) is 1200 rpm. The rotor may, however, have an actual speed of 1100 rpm. Such a condition is known as "slip" and results in losses associated with induction type motors. Since these losses occur regardless of the operational speed of the motor, such losses are particularly undesirable if the motor runs for extended periods of time, such as a furnace blower motor.

As compared to two speed induction motors, two speed synchronous motors (e.g., permanent magnet motors) typically are more efficient because slip is eliminated. For example, with known permanent magnet synchronous A.C. motors, the stator includes a start winding and a main winding. Permanent magnets are secured at the outer circumference of the rotor. The permanent magnets are magnetized to form a number of poles equal to the number of poles formed by the main winding.

In initial operation, the magnetic fields generated by the start and main windings and the magnetic fields of the rotor permanent magnets couple and produce the torque necessary to cause rotor rotation. Once sufficient rotor speed is achieved, the start winding is de-energized. The rotor continues to rotate due to the coupling between the magnetic fields of the main winding and permanent magnets. No energy is lost as a result of having to induce currents in secondary conductors.

With permanent magnet motors, and in order to operate such motors at two speeds, a frequency controller is required. Specifically, the rotor permanent magnets form a fixed number a poles. Therefore, since the number of poles is fixed, in order to change the rotor speed, the supply voltage frequency must be changed. Control circuitry for controlling the frequency of the supply voltage can be complex and expensive.

In addition, with permanent magnet synchronous AC motors, at motor start-up, significant parasitic torque is generated. Specifically, at motor start-up, the fields of the stator windings and the permanent magnets attempt to cause the rotor to instantaneously transition from a standstill condition to a condition at which the rotor is rotating at synchronous speed. Of course, the rotor cannot make such an instantaneous transition.

The significant forces acting on the permanent magnet rotor at motor start-up result in the generation of undesired noise and vibration. Such noise and vibration are highly undesirable, particularly in applications such as a furnace blower motor or other air-moving applications where such noise can be disruptive and annoying. The vibration can also reduce the operating life of the motor. Therefore, although permanent magnet synchronous AC motors have improved run efficiency as compared to induction motors, such permanent magnet motors have undesirable start-up characteristics.

Accordingly, it is desirable and advantageous to provide a two speed electric motor which is more efficient than known two speed induction motors. Also, it is desirable and advantageous to provide such a motor which does not require a supply voltage frequency controller to change the motor speed. Further, it is desirable and advantageous to provide an electric motor which can exhibit the run efficiency of a permanent magnet motor and the starting characteristics of an induction motor. Such an electric motor, of course, must also be cost effective to manufacture and use so that manufacturing cost increases associated with manufacturing such a motor may be significantly offset by the savings which result from use of such motor.

An object of the present invention is to provide a two speed electric motor having a squirrel cage rotor and which is more efficient than known two speed induction motors.

Another object of the present invention is to provide such a motor which includes rotor permanent magnets but does not require a supply voltage frequency controller.

Yet another object of the present invention is to provide an electric motor which has the running efficiency advantages of a permanent magnet synchronous AC motor but does not have the adverse starting characteristics of a permanent magnet AC motor.

Still another object of the present invention is to provide such an electric motor which, during at least one mode of running condition, does not have the slip, or losses, associated with typical induction run motors.

Still yet another object of the present invention is to provide such an electric motor which is cost effective to manufacture and use.

SUMMARY OF THE INVENTION

These and other objects of the invention are attained by several forms of apparatus which, in one embodiment, is in the form of a two speed electric motor including a motor stator having a start winding and first and second main windings. The first main winding forms a first, lower, number of poles and the second main winding forms a second, higher, number of poles, when energized. For example, the first main winding forms two poles and the second main winding forms four poles. Four pole/six pole, six pole/eight pole and many other pole configuration combinations are possible.

The motor also includes a motor rotor having a rotor core, a rotor shaft, permanently magnetized locations, and secondary conductors. The rotor core preferably is comprised of a plurality of laminations. The rotor shaft extends through the rotor core and is coaxial with the rotor core axis of rotation. The secondary conductors also extend through the rotor core and are arranged axially with respect to the rotor shaft. Such secondary conductors are offset from the outer circumference or periphery of the rotor core and are connected at opposite ends of the core by end rings, as will be understood by persons of ordinary skill.

In the preferred embodiment, notches are formed at the outer periphery of the rotor core. Each notch is radially aligned with at least one secondary conductor. Permanent magnets are located in the notches. The permanent magnets are magnetized to form a number of poles equal to the higher number of poles for the particular two speed configuration that has been selected.

A switching unit responsive to the requirements of the system in which the motor is used may advantageously be used to control selection of the mode of stator winding energization. For example, in a furnace blower motor application, the switching unit causes the second main winding to be energized when the furnace is required to operate in the low fire mode. When the furnace is required to operate in the high fire mode, the switching unit causes the first main winding to be energized.

In one specific embodiment for a furnace blower motor application, the first and second main stator windings are configured to form four poles and six poles, respectively. The motor rotor permanent magnet locations are magnetized to form six magnetic poles. In this embodiment, the switching unit causes the first main winding to be energized for the high fire mode and the second main stator winding to be energized for the low fire mode.

In operation, and under all conditions of motor start-up, the stator start winding and the first main winding are energized. The magnetic fields generated by such windings induce currents in the squirrel cage conductors of the rotor, and the magnetic fields of such windings and rotor conductors couple and the rotor begins to rotate. Since the start winding and the first main winding form four poles, the magnetic fields of such windings do not effectively couple to the magnetic fields of the rotor permanent magnets configured to form six poles.

Once the rotor has sufficient speed, the start winding is de-energized. If the furnace is to operate in the high fire mode, the switching unit causes the first main winding to remain energized. As a result, the motor continues operation in a relatively higher speed, four pole mode of operation. If the furnace is to operate in the low fire mode, and once the rotor speed exceeds the six pole synchronous speed, the switching unit energizes the second main winding and the first main winding is de-energized. As a result, the rotor speed decreases. When the rotor speed equals the six pole synchronous speed, i.e., 1200 rpm, the magnetic fields of the rotor permanent magnets couple with, and "lock" into, the magnetic fields generated by the stator windings. The rotor then rotates at substantially the synchronous speed for the six pole configuration, i.e., 1200 rpm. If the furnace is required to later operate in the high fire mode, the switching unit will energize the first main winding and de-energize the second main winding. The motor then operates as an induction motor and the rotor speed increases.

In applications such as furnace blower motors, the low fire mode is utilized for significantly greater periods of time than the high fire mode. For example, a normal heating season in some parts of the world lasts for about two hundred days during a one year time period. During the heating season, cold weather which requires the furnace to operate in the high fire mode may persist for about ten days. During the other, and more mild, one hundred and ninety days, the weather conditions require the furnace to operate in the low fire mode. Since the above described motor operates as a permanent magnet motor in the low fire mode, efficiencies of such a permanent magnet motor are provided approximately ninety five percent (95%) of the time during a heating season. By operating as a permanent magnet motor for such a significant period of time, significant savings result from reduced energy consumption as compared to the energy consumption of a two speed induction motor. Further, such efficiencies are obtained without requiring any complex voltage source frequency controls.

Also, these efficiencies are obtained without the adverse starting characteristics of a permanent magnet motor. As explained above, the present motor starting as an induction motor. Therefore, the detrimental noise and vibrations generally associated with starting a permanent magnet motor are eliminated.

BRIEF DESCRIPTION OF THE DRAWINGS

FIG. 1 is a plan end view of a motor rotor with the end ring cut away.

FIG. 2 is a perspective view of the motor rotor shown in FIG. 1.

FIG. 3 is a side cross-sectional view of an electric motor including the motor rotor shown in FIGS. 1 and 2.

DETAILED DESCRIPTION OF THE DRAWINGS

FIG. 1 is a plan end view of a motor rotor 10 with the end ring cut away. Rotor 10 includes a rotor shaft 12 mounted so that the axis of shaft 12 is coaxial with the rotor axis of rotation. An outermost lamination 14 forming a part of the core of rotor 10 is shown in FIG. 1. Lamination 14 includes a rotor shaft opening 16 through which rotor shaft 12 extends and a plurality of secondary conductor openings 18.

A plurality of T-shaped notches 20 are formed at an outer periphery 22 of lamination 14. Teeth portions 24 of lamination 14 define the edges of notches 20. The other laminations forming the core of rotor 10 are identical to outermost lamination 14.

Rotor 10 includes squirrel cage, or secondary, conductors 26 arranged axially with respect to rotor shaft 12. Conductors 26 are radially offset from outer periphery 22 of lamination 14 and extend through openings 18. Permanent magnets 28 are located in notches 20. Each permanent magnet 28 is radially aligned with at least one squirrel cage conductor 26.

Permanent magnets 28, as shown in FIG. 1, have a substantially T-shaped cross sectional shape and are located within similarly shaped notches 20 formed at outer periphery 22 of lamination 14. The shape of magnets 28 and notches 20 facilitates securing magnets 28 at outer periphery 22 of laminations 14 without requiring adhesives or other securing apparatus.

Of course, the specific configuration of permanent magnets 28 is not limited to the T-shaped configuration shown in FIG. 1. For example, magnets 28 and notches 20 could be wedge-shaped with the narrow portion of such wedge shaped magnets positioned at outer periphery 22 of laminations 14. Utilizing such configurations for magnets 28 eliminates a need for adhesives to secure such magnets 28 at outer periphery 22 of laminations 14. Of course, magnets which are attached at outer periphery 22 of laminations 14 using an adhesive or other attachment processes could be utilized.

Secondary conductors 26 and permanent magnets 28 are spaced apart by approximately about 0.015 inches at a most narrow portion of lamination 14 between secondary conductors 26 and permanent magnets 28. Of course, secondary conductors 26 and magnets 28 could be spaced apart more or less than 0.015 inches. As such spacing increases, however, the magnet flux losses of secondary conductors 26 may increase. More particularly, a flux leakage path exists between secondary conductors 26 and permanent magnets 28. In operation, until the lamination material between conductors 26 and magnets 28 is saturated, magnetic fluxes are conducted along such flux leakage paths. The amount of leakage flux can be reduce by reducing the lamination material between conductors 26 and magnets 28. Conductors 26 and magnets 28 could even be in contact. Laminations 14, however, must be configured to provide sufficient support for magnets 28.

Although twenty four squirrel cage conductors 26 are illustrated in connection with rotor 10, it is contemplated that more or fewer conductors 26 could be utilized. The exact number of conductors 26 utilized typically is a function of noise reduction, number of stator slots, pole structure, and other desired motor characteristics.

A perspective view of rotor 10 is shown in FIG. 2. As shown in FIG. 2, laminations 14 and magnets 28 are skewed as hereinbefore described. Such skewing can reduce noise and improve starting characteristics as is well known in the art. First and second end rings 32A–B, formed at opposite ends of rotor 10, also are shown in FIG. 2. End rings 32A–B short secondary conductors 26.

With respect to the manufacture and assembly of rotor 10, laminations 14 are stamped from steel. As is well known, each lamination 14 may be annealed or otherwise treated so that a coating of insulating material is formed thereon. Laminations 14 are then stacked to a desired height to form the rotor core. Rotor laminations 14 are stacked so that openings 16 for rotor shaft 12 are aligned and so that openings 18 for squirrel cage conductors 26 and notches 20 for permanent magnets 28 are skewed.

Once laminations 14 are stacked to the selected height and aligned, permanent magnets 28 are formed in notches 20 at outer periphery 22 of laminations 14 using an injection molding process. Particularly, magnets 28 are formed from neodymium iron using injection molding. Neodymium iron in a form suitable for injection molding is commercially available from the Magnaquench division of General Motors located in Anderson, Ind. Alternatively, magnets 28 could be manufactured using alternative techniques such as extrusion, casting and sintering processes, and then secured to outer periphery 22 of laminations 14.

Squirrel cage conductors 26 and rotor end rings 32A–B are then formed using an aluminum die cast process. Rotor shaft 12 is then inserted through aligned openings 16 in each lamination 14 and end rings 32A–B. Rotor shaft 12 is secured to end rings 32A–B by welding, for example. Magnets 28 may then be magnetized. Additional details regarding assembly of a rotor and a motor are set forth, for example, in U.S. Pat. No. 4,726,112, which is assigned to the present assignee.

FIG. 3 illustrates a motor 50 including rotor 10. Motor 50 includes a housing 52 having motor endshields 54A–B secured thereto. Motor endshields 54A–B include supports 56A–B for bearing assemblies 58A–B. Rotor shaft 12 is coaxially aligned with bearing assemblies 58A–B and extends through openings 60A–B formed in endshields 54A–B.

Motor 50 also includes a stator 62 having a stator core 64 and stator windings 66. Stator windings 66 include a start winding and a first and a second main winding. The first winding is wound to form a first, lower, number of poles and the second main winding is wound to form a second, higher, number of poles. The start winding is wound to form a number of poles equal to the number of poles of the first main winding. Stator core 64 forms a rotor bore 68. Rotor shaft 12 is concentrically arranged axially of stator core 64, and rotor core 14 is positioned concentrically with rotor shaft 12.

A switching unit 70, shown in phantom, is mounted to endshield 54A. Switching unit 70 includes, in one form, a movable mechanical arm 72. A centrifugal force responsive assembly 74, also shown in phantom, is mounted to rotor shaft 12 and includes a push collar 76 which engages mechanical arm 72. Push collar 76 is slidably mounted on rotor shaft 12. Assembly 74 also includes a weighted arm and spring (not shown in detail) secured to rotor shaft 12. The weighted arm is calibrated to move from a first position to a second position when the rotor speed exceeds a predetermined speed. When the weighted arm moves to the second position, push collar 76 also moves from a first position to a second position. As a result, mechanical arm 72 of switching unit 70 moves from a first position to a second position, which causes switching unit 70 to switch from a first circuit-making position to a second circuit-making position. Switching unit 70 is utilized separately in some applications (without arm 72) and switching unit 70 and assembly 74 are utilized in combination in other applications. Switches used to control energization of start and main windings are well known.

In one specific embodiment, the first main stator winding is wound to form four poles and the second main stator winding is wound to form six poles. Motor rotor permanent magnets 28 are magnetized to form six poles. Switching unit 70 is coupled to an external control, such as a furnace control. Centrifugal force responsive assembly 74 is not utilized in this particular application. Switching unit 70 causes the first main winding to be energized for the high fire mode and the second main stator winding to be energized for the low fire mode.

In operation, and at motor start-up, the stator start winding and the first main winding are energized. The magnetic fields generated by such windings induce currents in squirrel cage conductors 26 of motor rotor 10, and the magnetic fields of such windings and conductors 26 couple and rotor 10 begins to rotate. Since the start winding and first main winding form four poles, the magnetic fields of the such windings do not effectively couple to the magnetic fields of rotor permanent magnets 28 configured to form six poles.

Once rotor 10 has sufficient speed, the start winding is de-energized. If the furnace is to operate in the high fire mode, switching unit 70 causes the first main winding to remain energized. As a result, motor 50 operates as an induction motor in a relatively higher speed, four pole mode of operation. If the furnace is to operate in the low fire mode, however, switching unit 70 energizes the second main winding and the first main winding is de-energized. As a result, the rotor speed decreases.

When the rotor speed equals the six pole synchronous speed, i.e., 1200 rpm, the magnetic fields of rotor permanent magnets 28 couple with, and "lock" into, the magnetic fields generated by the second main winding. Rotor 10 then rotates at substantially the synchronous speed for the six pole configuration, i.e., 1200 rpm. If the furnace is required to later operate in the high fire mode, switching unit 70 energizes the first main winding and de-energizes the second main winding. Motor 50 then operates as an induction motor and the rotor speed increases.

In another application, and as in the embodiment discussed above, the first main stator winding is wound to form four poles and the second main stator winding is wound to form six poles. Motor rotor permanent magnets 28 are magnetized to form six poles. In this particular application, motor 50 operates as a single speed motor. Centrifugal force responsive assembly 74 is utilized and is calibrated to transition from the first position to the second position when the rotor speed exceeds 1200 rpm, i.e., six pole synchronous speed. When switching unit 70 is in the first circuit-making position, the first main winding is energized, i.e., the lower pole mode. When unit 70 is in the second circuit-making position, the second main winding is energized, i.e., the higher pole mode. Centrifugal force responsive assemblies and switches are well known and are described, for example, in more detail in U.S. Pat. Nos. 4,726,112 and 4,856,182, both of which patents are assigned to the present assignee.

In operation, and at motor start-up, switching unit 70 is in the first circuit-making position and the first main winding and the start winding are energized. The magnetic fields generated by such windings induce currents in squirrel cage conductors 26 of motor rotor 10. The magnetic fields of such windings and rotor secondary conductors 26 couple and rotor 10 begins to rotate. Since the first main winding and start winding are energized to form four poles, the magnetic fields of such windings do not effectively couple to the magnetic fields of permanent magnets 28 which are magnetized to form six poles.

Once the speed of rotor 10 exceeds 1200 rpm, the weighted arm of assembly 74 causes push collar 76 to move to the second position. Push collar 76 causes mechanical arm 72 to move to the second position, and switching unit 70 switches to the second circuit-making position. The second main winding is then energized. As a result, the speed of rotor 10 decreases. When the rotor speed equals the six pole synchronous speed, i.e., 1200 rpm, the magnetic fields of the rotor permanent magnets 28 couple with, and "lock" into, the magnetic fields generated by the second main winding. Rotor 10 then rotates at substantially the synchronous speed for the six pole configuration, i.e., 1200 rpm. As described above, rotor 10 is "dragged" or "coasts" into synchronous speed rather than "pushed" into synchronous speed. Enabling rotor 10 to coast into synchronous speed is much easier than attempting to "push" rotor 10 into synchronous speed with a lower pole induction winding, which is typical in known line start synchronous A.C. motors.

In both the two speed and one speed configurations described herein, starting noise and vibration are substantially eliminated. Specifically, since the motor starts as an induction motor, noise and vibration generally associated with permanent magnet motors are eliminated. Further, since there is no mutual coupling between the stator winding and permanent magnet magnetic fields during motor starting, parasitic torques are substantially eliminated. Also, by operating the motor as a permanent magnet motor for a significant percentage of the motor operating time, the motor has improved run efficiency as compared to induction run motors. Moreover, in the two speed configuration, no supply voltage frequency controller is required. Therefore, in addition to improved run efficiency, a lower cost two speed motor is provided.

Also, in both the two speed and one speed configurations, the rotor "coasts" or "drags" in to synchronous speed as described above. Problems associated with known synchronous A.C. motors which attempt to push a rotor into synchronous speed are substantially eliminated by enabling the rotor to coast in to synchronous speed.

Many modifications and variations of motor 50 illustrated in FIG. 3 are possible and contemplated. For example, motor 50 could be configured to operate as a two pole/four pole motor, a six pole/eight pole motor, or some other two mode motor. The specific structure of motor 50, such as the type of bearing assemblies 58A–B and motor frame, of course, may also vary. Switches other than centrifugal force responsive switches can be used for the one speed unit. For example, a rotor speed sensor and switch mounted to stator 62 or optic based controls could be utilized. Further, laminations 14, permanent magnets 28 and secondary conductors 26 of rotor 10 could be formed from many different materials and are not limited to the specific materials and assembly process described herein.

From the preceding description it is evident that the objects of the invention are attained. Although specific embodiments have been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A method of fabricating a rotor for an electric motor, said method comprising the steps of:

forming a rotor core, the core having an outer periphery, a central rotor shaft opening, a plurality of secondary conductor openings radially offset from the outer periphery, and a plurality of notches, each of the notches having an open end at the outer periphery of the core;

securing permanent magnet material in each of the notches; and securing secondary conductors within each of the secondary conductor openings, a number of poles formed by the permanent magnet material selected to be different from a number of poles formed by the secondary conductors in operation.

2. A method in accordance with claim 1 wherein the step of securing secondary conductors comprises pressure casting aluminum in the secondary conductor openings and further comprises pressure casting first and second end rings attached to respective ends of the secondary conductors.

3. A method in accordance with claim 1 wherein the step of securing permanent magnet material comprises injection molding permanent magnetizable material in the notches.

4. A method in accordance with claim 3 wherein the step of securing permanent magnet material comprises injecting liquidfied neodymium containing material into the notches and retaining such material in the notches until such material hardens.

5. A method of fabricating a rotor for an electric motor, said method comprising the steps of:

forming a rotor core, the core having an outer periphery, a central rotor shaft opening, a plurality of secondary conductor openings radially offset from the outer periphery, and a plurality of notches, each of the notches having an open end at the outer periphery of the core;

injection molding permanent magnetizable material in the notches; and casting aluminum in the secondary conductor openings, the permanent magnetizable material and the cast aluminum secondary conductors selected so that a number of poles formed by the permanent magnetizable material is different from a number of poles formed by the secondary conductors in operation.

6. A method in accordance with claim 5 further comprising the step of pressure casting first and second end rings attached to respective ends of the secondary conductors.

7. A method in accordance with claim 5 wherein the step of casting aluminum in the secondary conductors comprises pressure casting aluminum in the secondary conductor openings.

8. A method in accordance with claim 7 further comprising the step of pressure casting first and second end rings attached to respective ends of the secondary conductors.

9. A method in accordance with claim 5 wherein the step of injection molding permanent magnetizable material in the notches comprises injecting liquidfied neodymium containing material into the notches and retaining such material in the notches until such material hardens.

* * * * *